(12) United States Patent
Holloway

(10) Patent No.: US 12,278,343 B1
(45) Date of Patent: Apr. 15, 2025

(54) EMERGENCY ELECTRICAL ENERGY

(71) Applicant: Andrew J. Holloway, Loveland, CO (US)

(72) Inventor: Andrew J. Holloway, Loveland, CO (US)

( * ) Notice: Subject to any disclaimer, the term of this patent is extended or adjusted under 35 U.S.C. 154(b) by 0 days.

(21) Appl. No.: 18/629,320

(22) Filed: Apr. 8, 2024

(51) Int. Cl.
| | |
|---|---|
| *H01M 10/38* | (2006.01) |
| *H01G 11/26* | (2013.01) |
| *H01G 11/54* | (2013.01) |
| *H01G 11/74* | (2013.01) |
| *H01G 11/78* | (2013.01) |
| *H01M 4/38* | (2006.01) |
| *H01M 10/04* | (2006.01) |
| *H01M 50/213* | (2021.01) |
| *H01M 50/51* | (2021.01) |
| *H01M 50/514* | (2021.01) |

(52) U.S. Cl.
CPC ............ *H01M 10/38* (2013.01); *H01G 11/26* (2013.01); *H01G 11/54* (2013.01); *H01G 11/74* (2013.01); *H01G 11/78* (2013.01); *H01M 4/38* (2013.01); *H01M 10/0422* (2013.01); *H01M 50/213* (2021.01); *H01M 50/51* (2021.01); *H01M 50/514* (2021.01); *H01M 2300/0005* (2013.01)

(58) Field of Classification Search
CPC .... H01M 10/38; H01M 4/38; H01M 10/0422; H01M 50/213; H01M 50/51; H01M 50/514; H01M 2300/0005; H01G 11/26; H01G 11/54; H01G 11/74; H01G 11/78
See application file for complete search history.

(56) References Cited

U.S. PATENT DOCUMENTS

| | | | | |
|---|---|---|---|---|
| 3,615,857 | A | * 10/1971 | Methlie, II | ............ H01M 6/145 429/118 |
| 4,032,696 | A | *  6/1977 | Urry | ....................... H01M 6/14 429/105 |
| 2004/0246635 | A1 | * 12/2004 | Morita | .................. H02J 7/0018 361/1 |

* cited by examiner

*Primary Examiner* — Helen Oi K Conley
(74) *Attorney, Agent, or Firm* — MP Patents, LLC

(57) ABSTRACT

An electrical energy system includes a series of cells each including an anode, a cathode, a vessel containing the anode and the cathode and an electrolyte solution contained within the vessel. The anode includes first and second electrode components formed from first and second materials, respectively. The cathode includes a third electrode material. The electrolyte solution is provided in contact with the first and second electrode components of the anode and with the cathode. At least one electrical energy store is coupled between a first conductor extending from a cathode of a first of the series of cells and a second conductor extending from an anode of a last of the series of cells.

9 Claims, 9 Drawing Sheets

EMERGENCY ELECTRICAL ENERGY

TECHNICAL FIELD

The disclosure pertains to electrical energy as well as sources thereof and storage devices therefore.

SUMMARY

The disclosure describes an electrical energy system. The electrical energy system includes a series of cells each including an anode, a cathode, a vessel containing the anode and the cathode and an electrolyte solution contained within the vessel. The anode includes first and second electrode components formed from first and second materials, respectively. The cathode includes a third electrode material. The electrolyte solution is provided in contact with the first and second electrode components of the anode and with the cathode.

The disclosure also describes a method for electrically powering an appliance. To each of a plurality of vessels, an anode is provided including an aluminum shaft having a zinc tail which projects from the shaft generally at an angle measuring 90 degrees or less. Each of the aluminum shaft and zinc tail is surrounded with a cathode including a copper cylinder. Each anode and each cathode is at least partially covered with an electrolyte solution. The plurality of cells are electrically coupled in series.

Further, the disclosure describes an electrical energy production kit. The electrical energy production kit includes a series of cells and an anhydrous electrolyte. Each of the series of cells includes an anode having first and second electrode components formed from first and second materials, respectively, a cathode having a third electrode material and a vessel containing the anode and the cathode. The anhydrous electrolyte, when in solution, is configured to induce oxidation at the anode and reduction at the cathode.

BRIEF DESCRIPTION OF THE FIGURES

The summary above, as well as the following detailed description of illustrative embodiments, is better understood when read in conjunction with the appended figures. For the purpose of illustrating the present disclosure, example constructions of the disclosure are shown in the figures. However, the present disclosure is not limited to specific methods and instrumentalities disclosed herein. Moreover, those of skill in the art will understand that the figures are not to scale. Wherever possible, like elements have been indicated by identical numbers.

Embodiments of the present disclosure will now be described, by way of example only, with reference to the following diagrams wherein.

DETAILED DESCRIPTION

The following detailed description illustrates embodiments of the present disclosure and manners by which they can be implemented. Although the best mode of carrying out the present disclosure has been disclosed, those skilled in the art would recognize that other embodiments for carrying out or practicing the present disclosure are also possible.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

Natural disasters are happening more frequently causing people to go without power for days or weeks. Generators, solar panels, wind turbines, and energy storage blocks can be very expensive and often, such as for people living in apartment buildings, are not practical. In these circumstances, the ability to use small appliances or accessories for illumination, fire starting and/or communication can save lives.

Disclosed devices, systems and methods enable a user to gather ingredients to create a basic electrolytic solution to power life saving devices such as lights, igniters and mobile devices. The system can remain in storage for years at a time without requiring service.

Embodiments of the present disclosure substantially eliminate, or at least partially address, problems in the prior art, enabling users to power small accessories and/or appliances in an eco-friendly manner while hopefully replacing millions of disposable batteries per national emergency and being inexpensive.

Additional aspects, advantages, features and objects of the present disclosure will be made apparent from the figures and the detailed description of the illustrative embodiments construed in conjunction with the appended claims that follow.

It will be appreciated that features of the present disclosure are susceptible to being combined in various combinations without departing from the scope of the present disclosure as defined by the appended claims.

Figure 1:
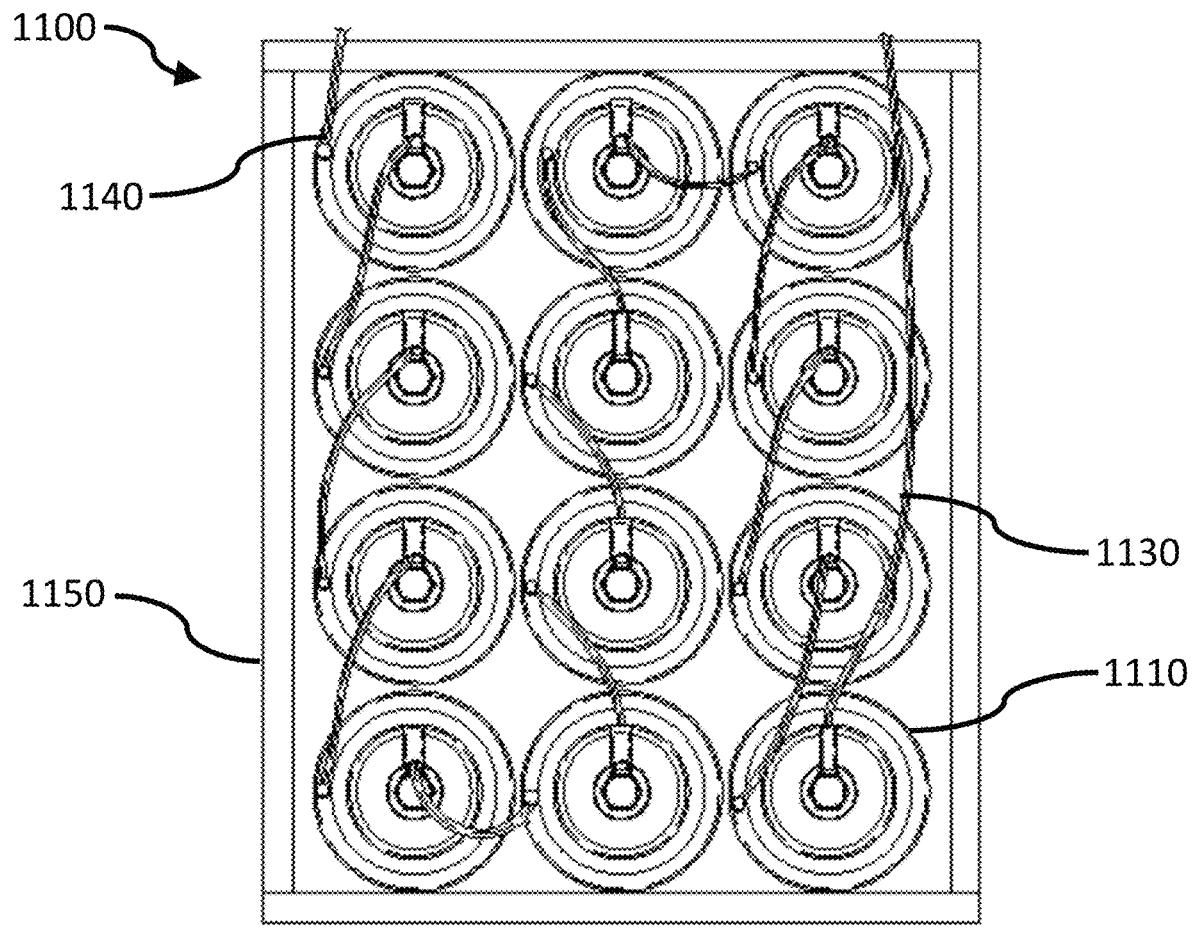
FIG. 1 illustrates an example electrochemical energy source suitable for use in association with disclosed electrical energy systems and methods for electrically powering appliances.
Figure 2:
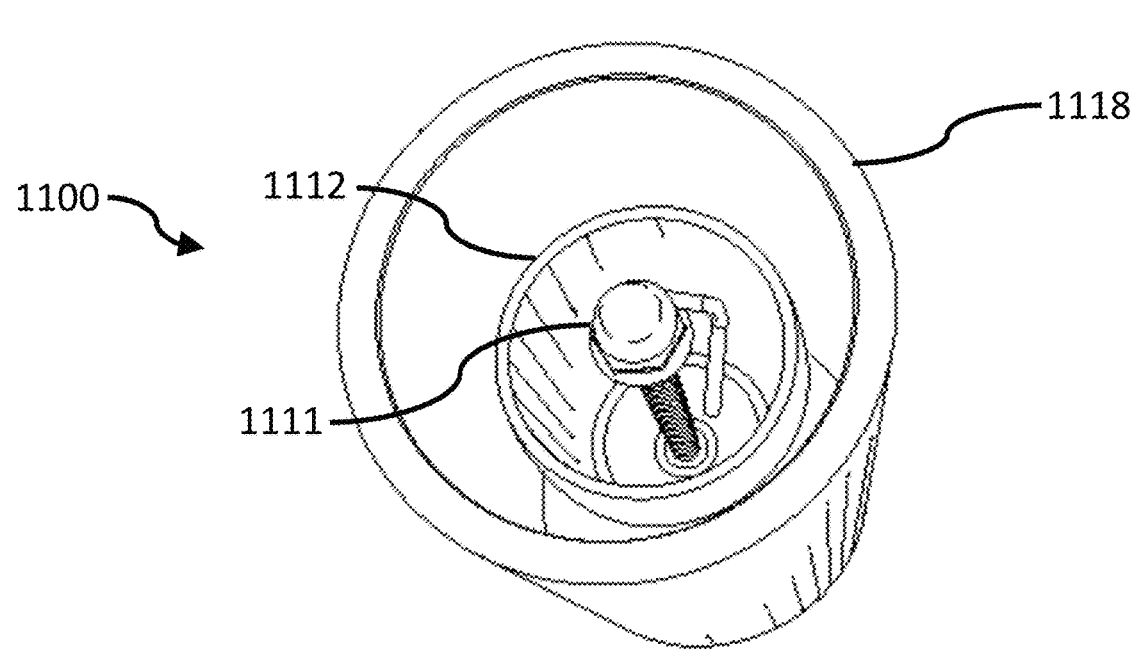
FIG. 2 illustrates an example electrochemical cell suitable for use in association with disclosed electrical energy systems and methods for electrically powering appliances.
Figure 3:
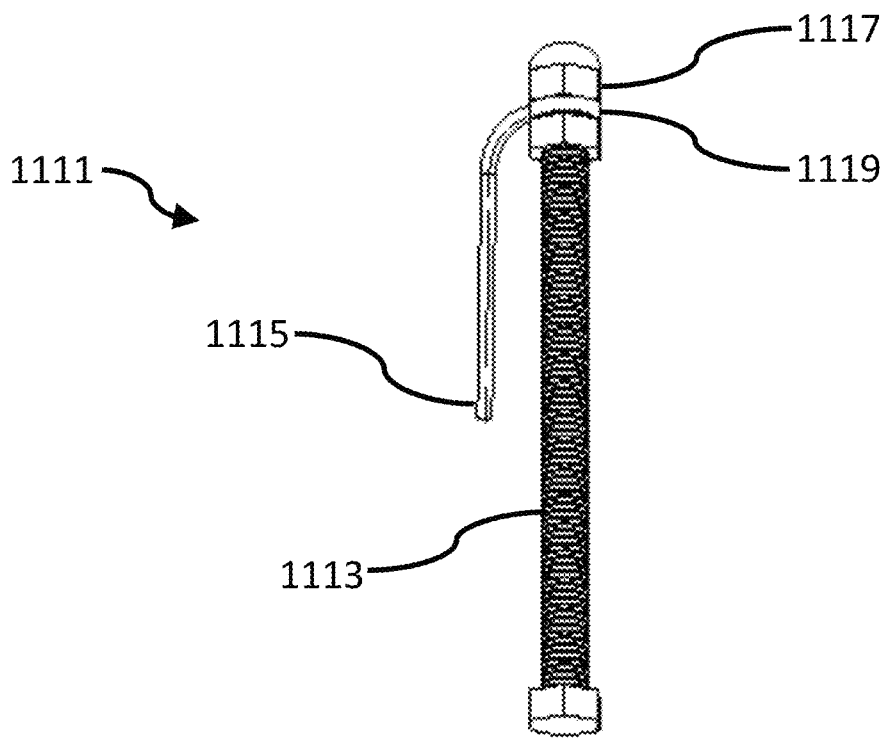
FIG. 3 illustrates an example anode suitable for use in association with disclosed electrochemical cells.
Figure 4:
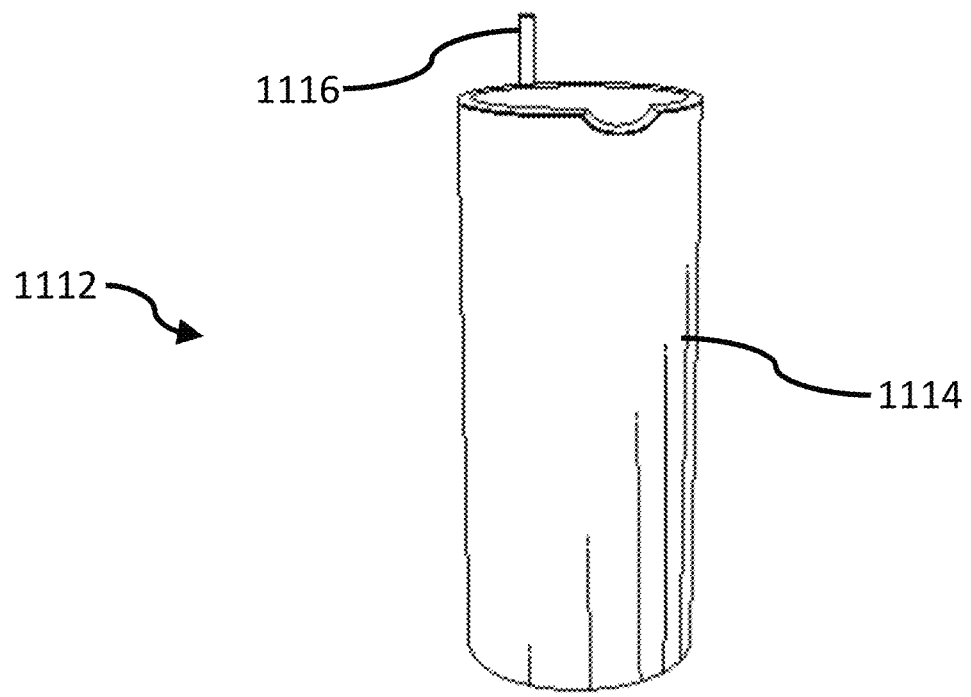
FIG. 4 illustrates an example cathode suitable for use in association with disclosed electrochemical cells.

FIGS. 1-8 illustrate an example electrical power system or electrical energy system 1000 and components thereof. Electrical energy system 1000 includes an electrochemical energy source 1100 which may take the form of a series of cells 1110 (FIGS. 1 & 2) each including an anode 1111, a cathode 1112, a vessel 1118 containing anode 1111 and cathode 1112 and an electrolyte solution (not visible) contained within vessel 1118. While FIG. 1 shows twelve cells, electrochemical energy source 1100 may include any number of cells compatible with a chosen electrical power store or electrical energy store for powering an appliance or accessory in cooperation with electrochemical energy source (EEE) 1100. In another example, electrochemical energy source 1100 includes 24 cells.

Anode 1111 (FIG. 3) includes first and second electrode components 1113 and 1115 formed from first and second materials, respectively, and is selectively fixedly coupled with vessel 1118 so as to be stable therein during use. First electrode component 1113 may further include an elongate shaft formed from the first electrode material and second electrode component 1115 may further include a spur or tail coupled with a first end of elongate shaft 1113. Tail 1115 may curve away from the first end of elongate shaft 1113 generally towards a second end of the elongate shaft. Tail 1115 may curve such that an angle of less than 90 degrees is formed between the tail and the shaft and, in a further example, such that a portion generally parallels the elongate shaft 1113.

Anode 1111 may further include a cap 1117 configured for threaded engagement with elongate shaft 1113 to couple tail 1115 therewith. A base portion of tail 1115 may be secured between a nut 1119 such as a hexagonal nut and cap 1117. Further, an electrical terminal may be provided to anode 1111, for example, at or near cap 1117 and/or tail component 1115. For example, elongate shaft 1113, tail 1115, nut 1119 and cap 1117 may provide a terminal and/or a conductor may be sandwiched between pairs of these components for electrical coupling thereto. The electrical terminal facilitates coupling of anode 1111, through an electrical conductor, with an electrical terminal of a cathode 1112 for a series coupling between cells 1000 (FIG. 1). Additionally and/or alternatively, the electrical terminal facilitates coupling with one or more other components such as one or more electrical energy stores and/or one or more appliances or accessories.

Cap 1117 and the tip of tail 1115 provide energy focal points for the anode. As energy builds in parallel cells of EEE or a capacitor, the build-up pushes back. This pressure increases oxidation which primarily takes place at the two focal points.

Cathode 1112 (FIG. 4) may be formed from a third electrode material and may take the form of a a cylindrical sheath configured to at least partially surround anode 1111. In an example, the amount of cathode 1112 supplied may be approximately ten times, by weight, volume or surface area, the amount of anode 1111 supplied. An electrical terminal 1116 may be provided to cathode 1112, for example, at or near a top edge extending or projecting above a surface of an electrolyte contained within vessel 1118. Electrical terminal 1116 facilitates coupling of cathode 1112, through an electrical conductor, with an electrical terminal of an anode 1111 for a series coupling between cells 1000 (FIG. 1). In an alternative, cathode 1112 may be formed as a coil also configured to partially surround anode 1111 and may be considered an inductor coil.

Additionally and/or alternatively, electrical terminal 1116 facilitates coupling with one or more other components such as one or more electrical energy stores and/or one or more appliances or accessories. For example, a first conductor 1120 extends from an anode 1111 of a first of the series of cells 1110 and a second conductor 1130 extends from a cathode 1112 of a last of the series of cells 1110. In an example, for a parallel connection, a negative terminal of the one or more electrical energy stores and/or the one or more appliances or accessories may be coupled with anode 1111 while a positive terminal of the one or more electrical energy stores and/or the one or more appliances or accessories may be coupled with cathode 1112.

The electrolyte solution is provided to vessel 1118 in contact with cathode 1112 and with the first and second electrode components of anode 1111. The solution may be formed from electrolytes derived from readily available biologic materials, organic materials and/or household food items including but not limited to conifer needles, ground cloves, cream of tartar, coffee, sodium and potassium. Further, the electrolyte solution may be formed from a powder in aqueous solution. In an example, the electrolyte powder includes 25 parts potassium chloride to 25 parts tartaric acid to 4 parts ground cloves. To form the solution, 2.5 g of potassium chloride, 0.4 g of ground cloves and 2.5 g of tartaric acid may be mixed and/or dissolved in 32 oz of water.

Another example electrolyte is comprised of 99.3% water, 0.33% Potassium, 0.28% Tartaric Acid and 0.09% ground cloves. The potassium provides a Lewis acid. The Tartaric Acid, an organic acid, enables a stable Ph for many hours and is available in powdered form. Ground cloves, which offer organic acids and minerals, exhibit sufficient electrical conductivity at a low Ph.

When using electrolytes with a Ph greater than 3.5, the zinc and aluminum anodes will become coated with zinc oxide over time and will need to be cleaned periodically when performance drops. An organic acid such as acetic acid solution is suitable for soaking the zinc and aluminum anodes for 4 hours or longer before the zinc and aluminum anodes are thoroughly rinsed. Alternatively or additionally, the zinc tails and aluminum caps can be removed and wiped down with steel wool or light sand paper.

Vessel 1118 (FIG. 2) may be formed from any of a variety of electrically insulative materials configured to reliably contain the electrolyte solution including but not limited to rubber, plastic, glass or fiberglass. Vessel 1118 is also coupled with and contains anode 1111 and cathode 1112 so that these components are relatively immobile during energy production.

Anode 1111 and cathode 1112 are configured to react with the electrolyte solution as in a galvanic or voltaic cell so as to oxidize anode 1111 and reduce cathode 1112 yielding a current through one or more conductors coupling an anode 1111 of one of cells 1110 directly or indirectly to a cathode 1112 of another one of cells 1110.

The first electrode material may include aluminum and the second electrode material may include zinc while the third electrode material may include copper. In such an example, a first redox reaction takes place between a zinc electrode component of the anode and a copper cathode as:

$$Cu^{2+}+Zn=Zn^{2+}+Cu$$

The standard electrode potential for Cu is 0.34 and the standard electrode potential for Zn is −0.76 such that a first theoretical voltage output of an electrochemical cell using a zinc anode and a copper cathode is 1.1V. With twelve such cells electrically coupled in series, the total theoretical voltage output is the product of 12 and 1.1V or 13.2V. Actual voltage output may be affected by any of a variety of factors including the concentration of the electrolyte solution and the purity of the materials from which the anode and cathode are formed.

Further, a second redox reaction takes place between the aluminum electrode component and the cathode as:

$$3Cu^{2+}+2Al=3Cu+2Al^{3+}$$

The standard electrode potential for Al is −1.66 such that a second theoretical voltage output of an electrochemical cell using an aluminum anode and a copper cathode is 4.34. With twelve such cells electrically coupled in series, the total theoretical voltage output is the product of 12 and 4.34V which yields 52.1V.

A zinc tail, being more reactive than a corresponding aluminum shaft, will provide the boost necessary to begin charging an electrical energy store. As energy builds within electrochemical energy source 1100 and connected electrical energy store, the aluminum shaft becomes more susceptible to oxidation and energy production increases due to the second redox reaction. To avoid coating of the aluminum shaft with zinc oxide which may reduce effectiveness, an anode tail comprised of zinc may be formed to have less surface area than its partner aluminum shaft.

Given that cells 1110 are not divided into distinct half cells within vessels 1118, salt bridges and/or ion bridges are unnecessary to balance an accumulation of negative charge in one half cell and accumulation of positive charge in another.

Electrochemical energy source 1100 may further include a frame and/or housing 1150 configured to hold the group of cells 1110 together and a battery box adapter (not visible) coupled with the frame and/or housing that limits voltage and has a dc plug for easy connection to battery packs and or appliances/accessories. For greater control, electrochemical energy source 1100 is provided with an on/off switch (not visible).

Figure 5:
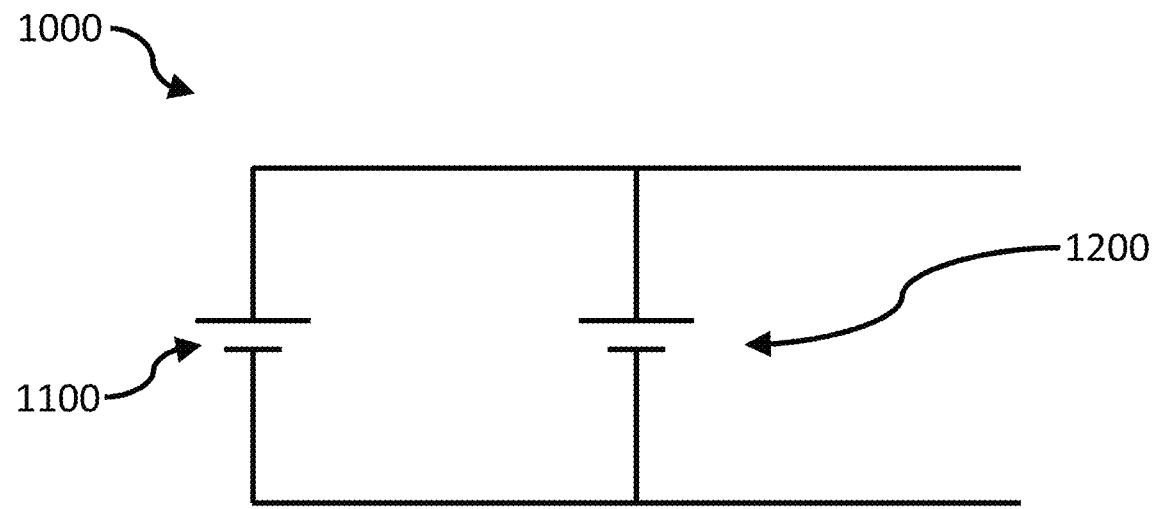
FIG. 5 schematically illustrates an example circuit for charging an electrical energy store.

Referring to FIG. 5, in an electrical energy system 1000, one or more electrical energy stores 1200 are coupled between first and second conductors such as 1120 and 1130 so that free ends of the conductors extend beyond the battery for coupling with an appliance/accessory 3000. Electrical energy store 1200 may help to stabilize the voltage of electrochemical energy source 1100 to smooth current delivery to an appliance/accessory such as 3000. Electrical energy system 1000 may further include a voltage disconnect circuit (not visible) for each electrical energy store so that cells of the electrical energy store cannot be damaged by excessive discharge.

Figure 6:
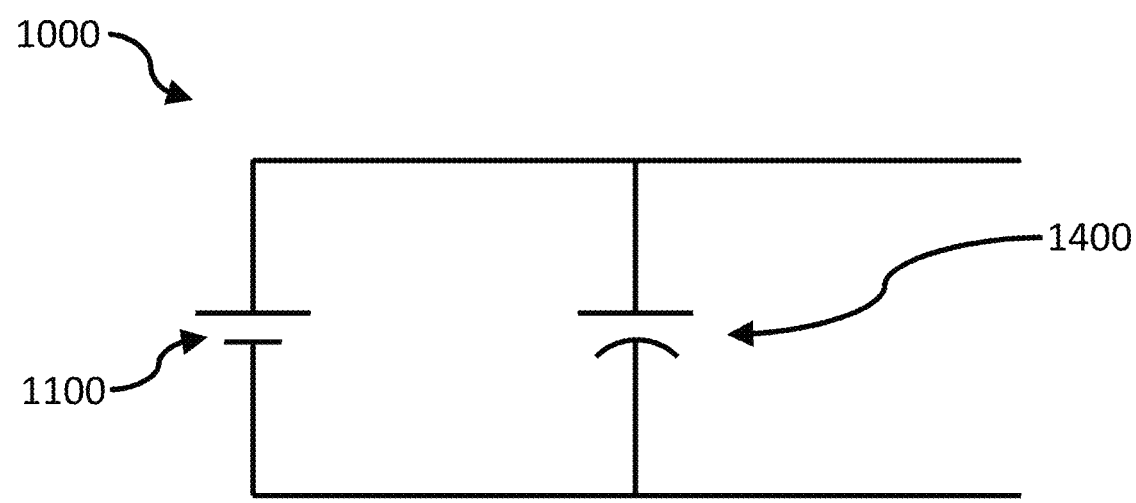
FIG. 6 schematically illustrates another example circuit for charging an electrical energy store.

Electrical energy store 1200 may include a nickel metal hydride battery. In an example, the nickel metal hydride battery includes five 1.2V cells coupled in series for a total added voltage of 6.0V. Referring to FIG. 6, additionally or alternatively, the electrical energy store may include a series of supercapacitors 1400. In an example, the series of supercapacitors 1400 may include ten units with a combined rating of 27V.

For simplicity, electrochemical energy source 1100 has been shown as a single voltage source in FIGS. 5-8 but, in practice, may represent a plurality of voltage sources such as a plurality of electrochemical cells 1110.

Figure 9:
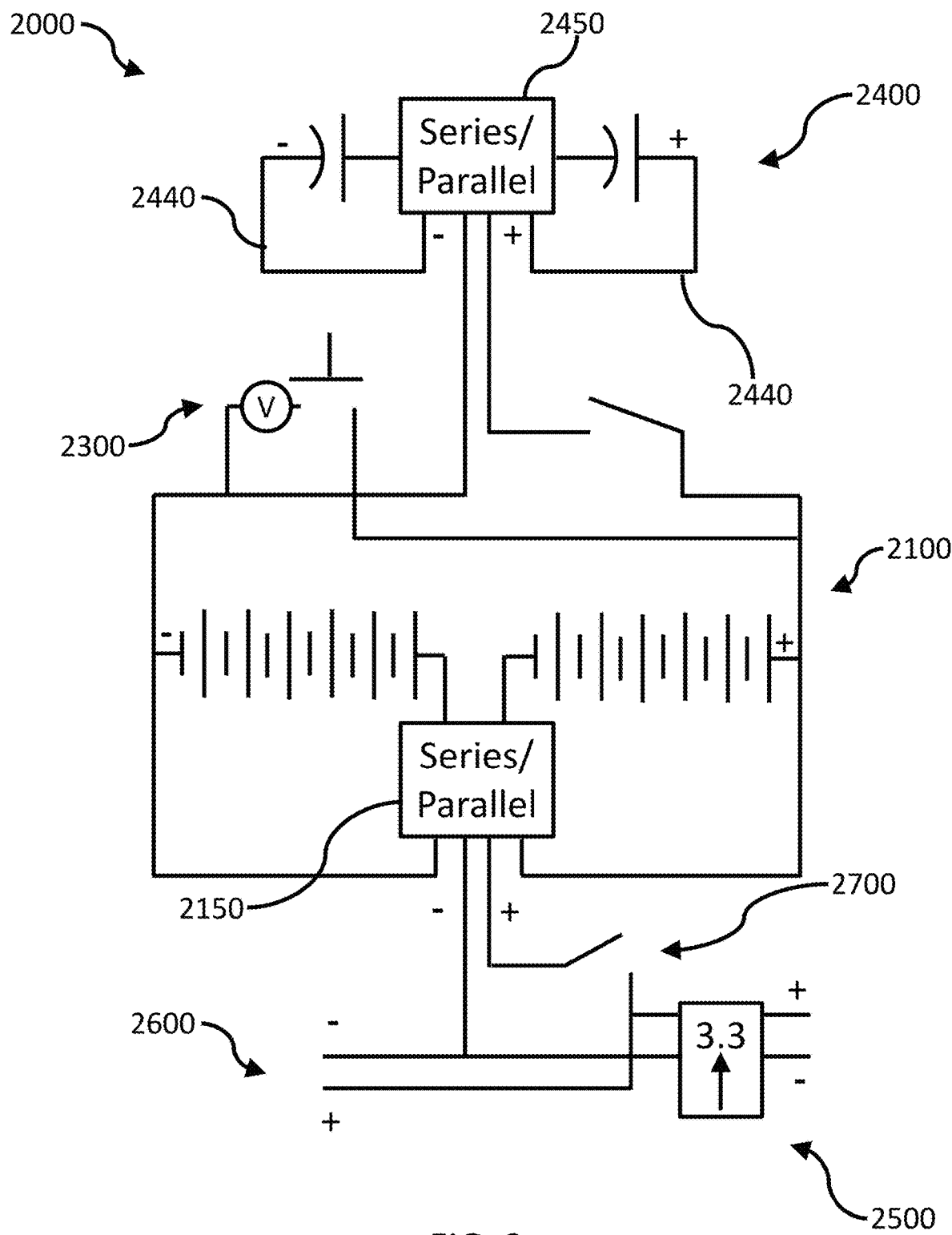
FIG. 9 schematically illustrates an example circuit for another electrical energy system.

FIG. 9 schematically illustrates an example circuit for another electrical energy system 2000. Electrical energy system 2000 includes an electrochemical energy source 2100 (EEE) having a number of cells, an internal capacitor subsystem 2400, a push-to-test voltmeter 2300, a pulse frequency modulation step-up 2500, an open port 2600 and an on/off switch 2700.

The internal capacitor subsystem 2400 has a number of capacitors 2440 and a switch 2450 configured to change the relationship among capacitors 2440 between series and parallel. The lower end of a capacitor can absorb very low current quickly. With multiple capacitors connected in series, a low voltage, low current output may be harvested while voltage of the system 2000 is being built to a functional level. The effective voltage from capacitor subsystem 2400 may be switched between 24.3V in series and 48.6V in parallel.

The electrochemical energy source 2100 has a switch 1250 configured to change the relationship among banks of cells between series and parallel. The output of system 2000 is 6V when cells of electrochemical energy source 2100 are switched into a series relationship or 12V when the cells are switched into a parallel relationship. With a given number of cells, the greater the number of cells connected in series, the more the power yield is spread out over a longer duration and, the greater the number of cells connected in parallel, the higher the power output is over a shorter duration.

The push-to-test voltmeter 2300 enables measuring voltage across electrochemical energy source 2100. In an example, pulse frequency modulation step-up 2500 may be 3.3V and have an 0.8-3.3V input with an approximate 3.3V output. Open port 2600 allows for connecting an appliance such as a light or an ignitor so that energy may be supplied thereto to produce illumination or ignition, respectively. In another example, one or more external capacitors may be plugged into open port 2600 in order to charge the external capacitors.

In an example, with capacitor subsystem 2400 being charged by electrochemical energy source 2100, a light and a fire starter can be powered from the 3.3V port. In another example, an external capacitor of up to 5.4V may be charged from the open port with capacitor subsystem 2400 being charged by electrochemical energy source 2100. In yet another example, with the capacitor subsystem 2400 disconnected, a light may be plugged into open port 2600 or the 3.3V port.

One or more of the components disclosed above may be offered as part of an electrical energy production kit. Anhydrous electrolyte, when in solution, is configured to induce or otherwise enable oxidation at anode 1111 and reduction at cathode 1112 as described above.

Disclosed electrochemical cells 1110, electrochemical energy sources 1100 and electrical energy systems 1000 are suitable for use in association with any of a variety of methods for electrically powering or energizing an appliance or accessory.

An example method includes forming a plurality of cells by, to each of a plurality of vessels, providing an anode including an aluminum shaft having a zinc tail which projects from the shaft generally at an angle measuring 90 degrees or less, surrounding each aluminum shaft and zinc tail with a cathode including a copper cylinder and at least partially covering each anode and each cathode with an electrolyte solution. The cells are electrically coupled in series. In an example, twelve cells are coupled in series.

The method may further include electrically coupling an electrical energy store with an anode of a first of the series of cells using a first conductor and with a cathode of a last of the series of cells using a second conductor such that the electrical energy store and the electrochemical energy source are coupled in parallel. In this configuration, the electrochemical energy source charges the electrical energy store to capacity. FIG. 5 schematically illustrates an example circuit for charging an electrical energy store wherein the electrical energy store includes a battery. FIG. 6 schematically illustrates another example circuit for charging an electrical energy store wherein the electrical energy store includes one or more capacitors which, again, may be supercapacitors.

The electrical energy store is subsequently disconnected from the electrochemical energy source, the electrolyte is poured or otherwise drained from the vessels, the anode and cathode are rinsed and fresh electrolyte is added back to the vessels to at least partially cover the anode and cathode.

Figure 7:
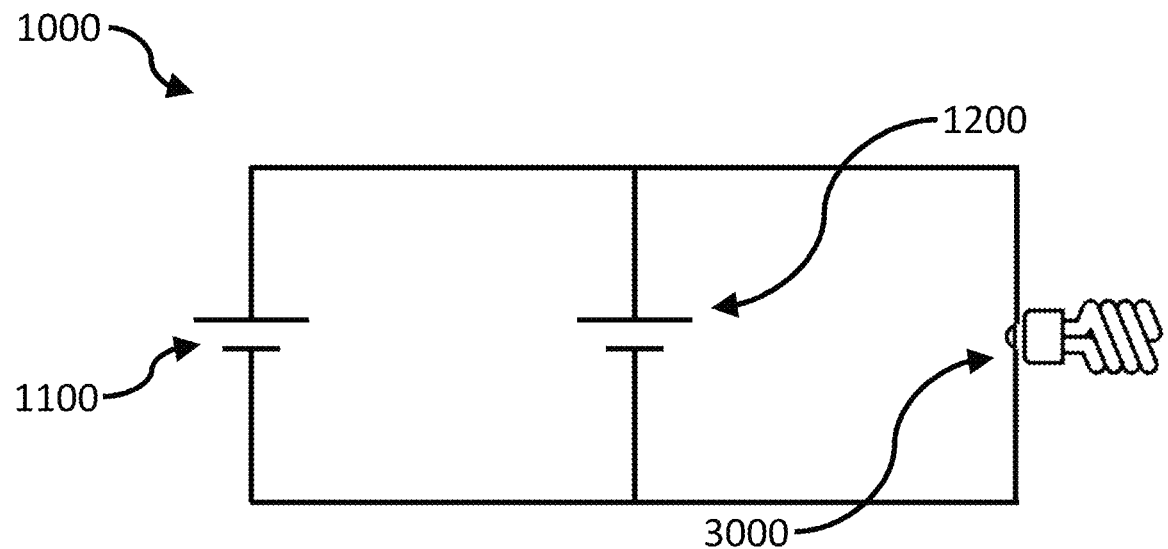
FIG. 7 schematically illustrates an example circuit for an electrical energy system.
Figure 8:
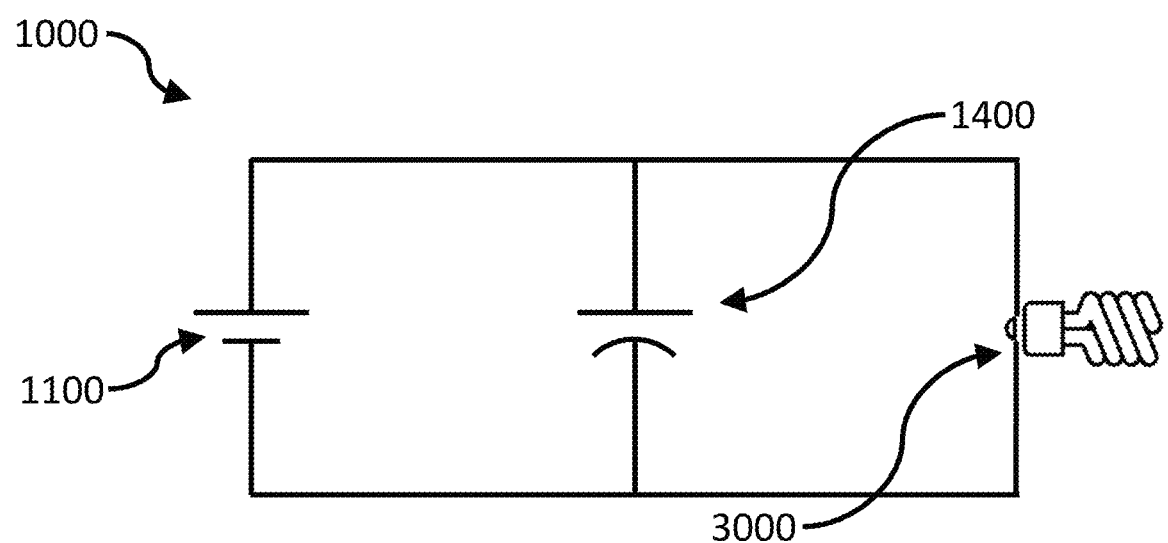
FIG. 8 schematically illustrates another example circuit for an electrical energy system.

The electrical energy store is then reconnected to the electrochemical energy source. An accessory or appliance may then be coupled with the system in parallel so that it may be powered by the system. FIG. 7 schematically illustrates an example circuit for an electrical energy system with an appliance coupled thereto wherein the electrical energy store is one or more batteries. FIG. 8 schematically illustrates another example circuit for an electrical energy system with an appliance coupled thereto wherein the electrical energy store is one or more capacitors which may be supercapacitors.

When the electrical energy store is no longer able to power the appliance, both the appliance and the electrical energy store are disconnected from the electrochemical energy source so that the electrolyte can be refreshed again. With the electrolyte refreshed, the electrical energy store can then be recharged and the system can again be used to power an appliance.

In a further example, free ends of the first and second conductors are finished with a plug for easy connection to the electrical energy store and/or an appliance to be powered. Any small electronic device (e.g., led lights, radios, phone charger adapter, emergency beacon, etc.) that can run on the power available can be adapted to use with this device by the addition of a voltage limiting circuit and external power plug.

Example 1

A 24-cell electrochemical energy source unit achieved a maximum voltage of 23V and produced an average current of 40 mA at 3.2V for 0.5 hrs before dropping below a usable voltage level of 2.8V.

Example 2

A combination of a 24-cell electrochemical energy source unit coupled with a 6V NiMH battery pack achieved a maximum voltage of 6.5V. Given an onboard voltage regulator of the NiMH battery pack, an average current of 40 mA was produced at 3.2V for 8 hours. The NiMH battery pack was left approximately half full and never dropped below a usable voltage level of 2.8V. However, at this stage, the electrolyte of the electrochemical energy source unit requires replacement. Thus, the combination yielded 320 mAh of energy. 240 mAh of this can be attributed to energy from the electrochemical energy source unit which benefits from a synergy between itself and the NiMH battery pack.

Example 3

Figure 10:
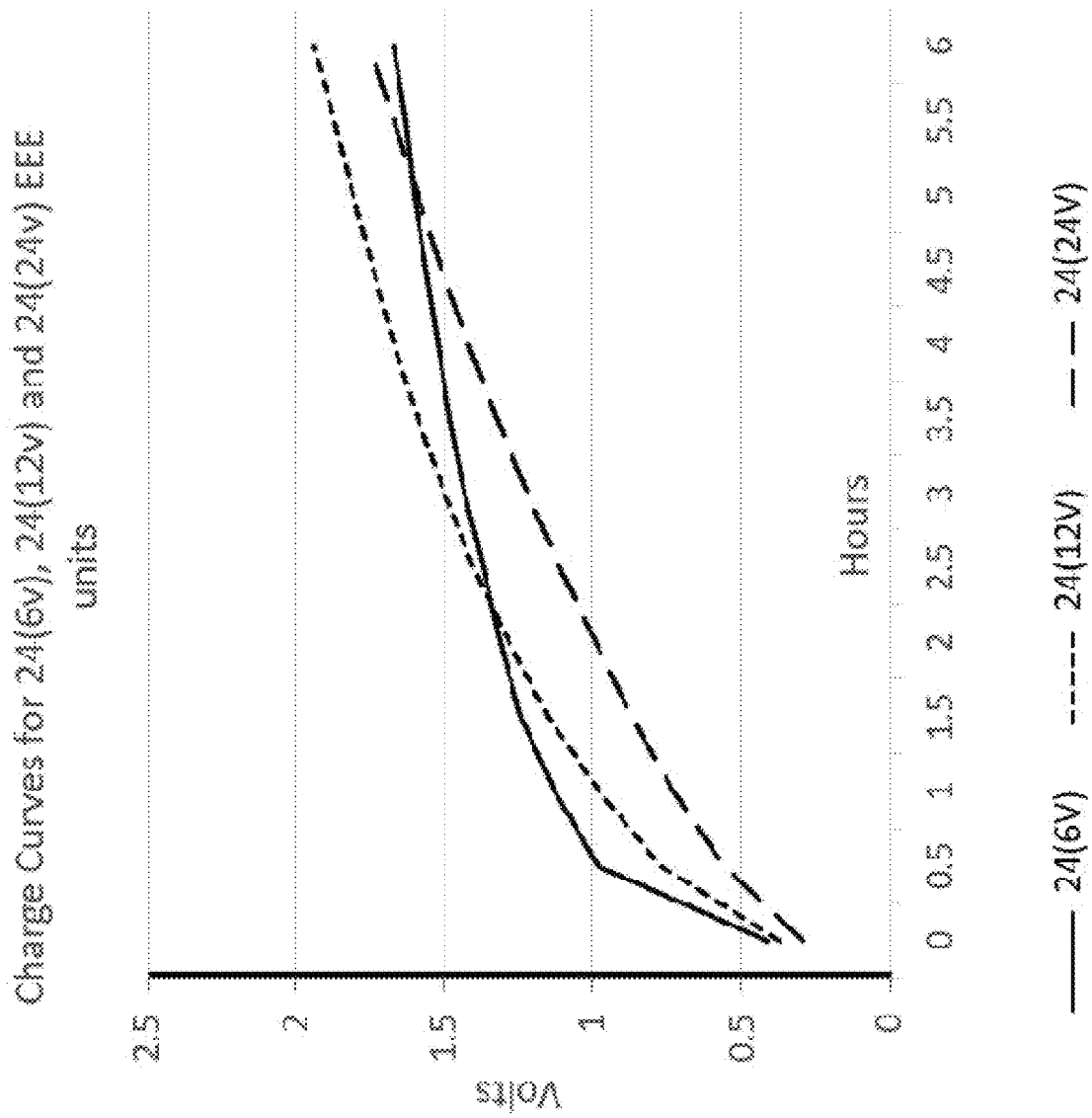
FIG. 10 illustrates a voltage vs. time graph of charge curves example electrical energy systems.

24 cells having a clove electrolyte and forming an electrochemical energy source were configured into two 12-cell subsets connected in parallel with cells of each subset connected in series. A 24.3V 1000 F internal capacitor coupled to the electrochemical energy source yielded a maximum voltage of 1.94V over a 6-hour charge cycle. FIG. 10 illustrates a voltage vs. time graph of charge curves for 6V, 12V and 24V electrochemical energy sources provided with clove electrolytes and coupled with a 24.3V 1000 F capacitor subsystem.

Example 4

24 cells having a clove electrolyte and forming an electrochemical energy source were configured into four 6-cell subsets connected in parallel with cells of each subset connected in series. A 24.3V 1000 F internal capacitor coupled to the electrochemical energy source yielded a maximum voltage of 1.67V over a 6-hour charge cycle (FIG. 10).

Example 5

24 cells having a clove electrolyte and forming an electrochemical energy source were configured into a single set of series-connected cells. A 24.3V 1000 F internal capacitor coupled to the electrochemical energy source yielded a maximum voltage of 1.94V over a 6-hour charge cycle (FIG. 10).

Example 6

Figure 11:
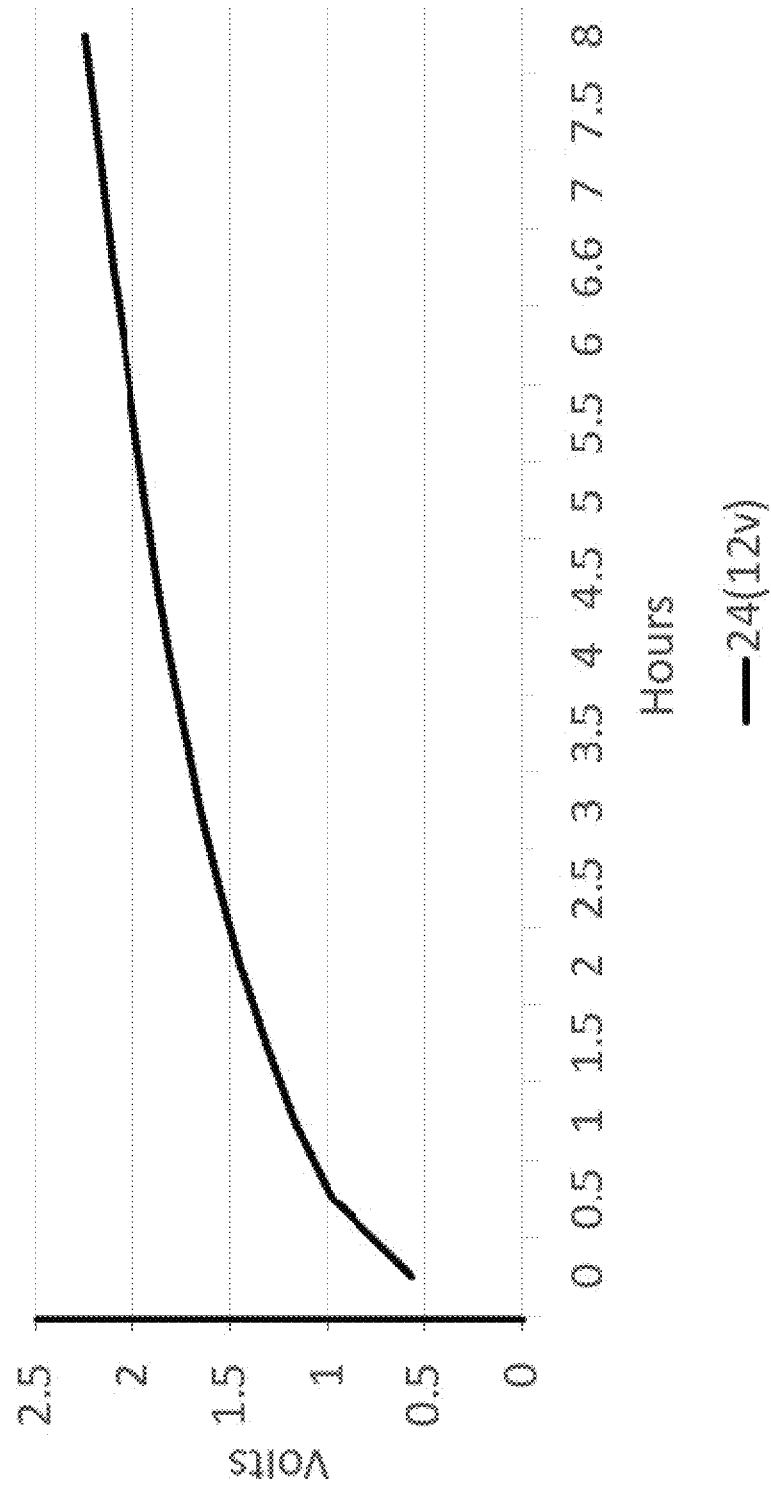
FIG. 11 illustrates a voltage vs. time graph of a charge curve for an example electrochemical energy source.

24 cells having a clove electrolyte and forming an electrochemical energy source were configured into two 12-cell subsets connected in parallel with cells of each subset connected in series. A 24.3V 1000 F internal capacitor coupled to the electrochemical energy source yielded a maximum voltage of 2.25V over an 8-hour charge cycle. FIG. 11 illustrates a voltage vs. time graph of a charge curve for an electrochemical energy source in accordance with this example.

Example 7

Figure 12:
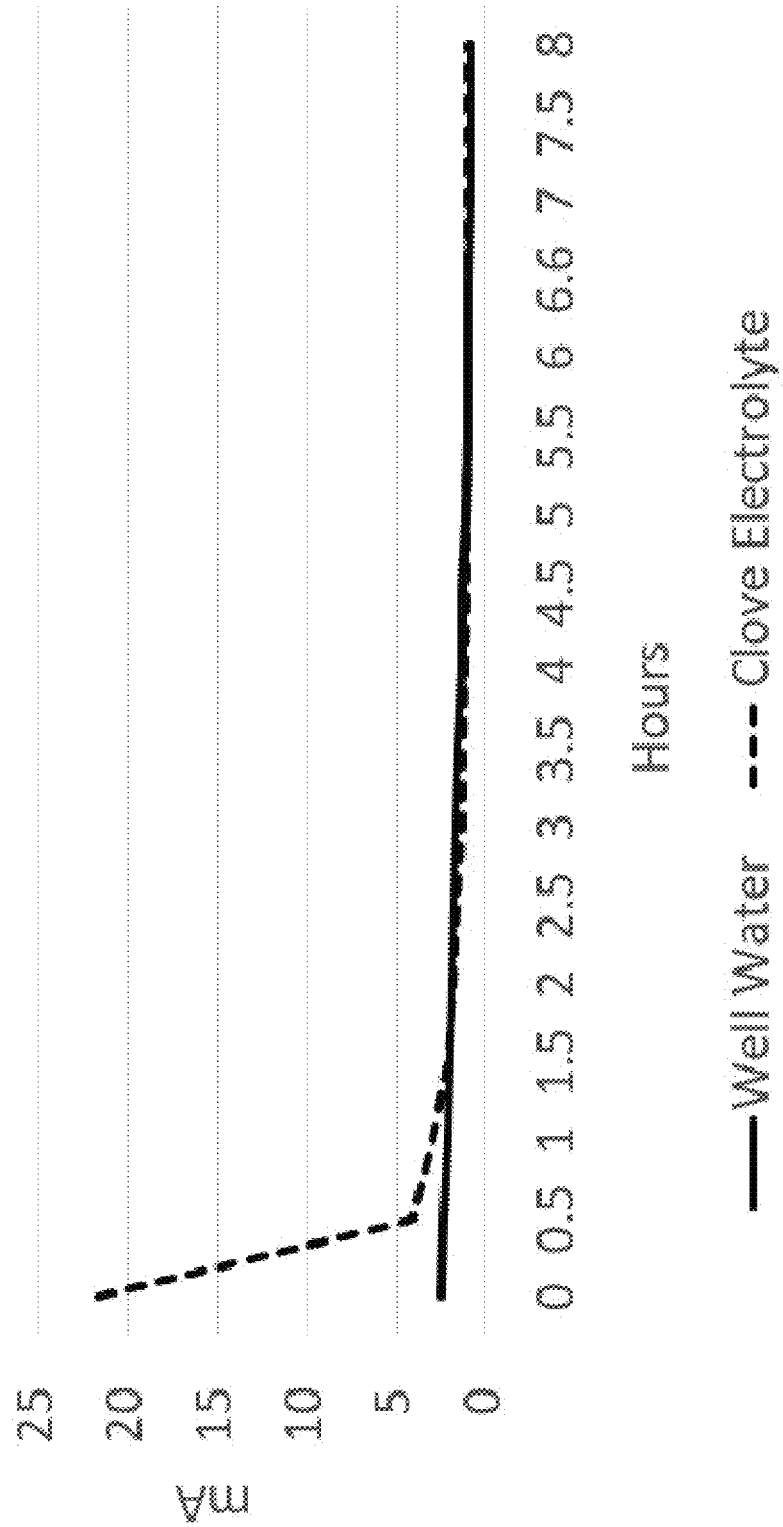
FIG. 12 illustrates a current vs. time graph of discharge curves for example electrochemical energy sources.

24 cells having a well water and forming an electrochemical energy source were configured into two 12-cell subsets connected in parallel with cells of each subset connected in series. An LED with a 20 ma driver was connected to the electrochemical energy source. The current output smoothly decayed from about 2.5 ma to 0.8 ma over 7 hours. FIG. 12 illustrates a current vs. time graph of discharge curves for an electrochemical energy source in accordance with this example.

Example 8

24 cells having a clove electrolyte and forming an electrochemical energy source were configured into two 12-cell subsets connected in parallel with cells of each subset connected in series. An LED with a 20 ma driver was connected to the electrochemical energy source. The current output decayed sharply from about 21.6 ma to about 4.1 ma over 0.5 hours and then smoothly to about 1.0 ma over the next 7.5 hours (FIG. 12).

Example 9

Figure 13:
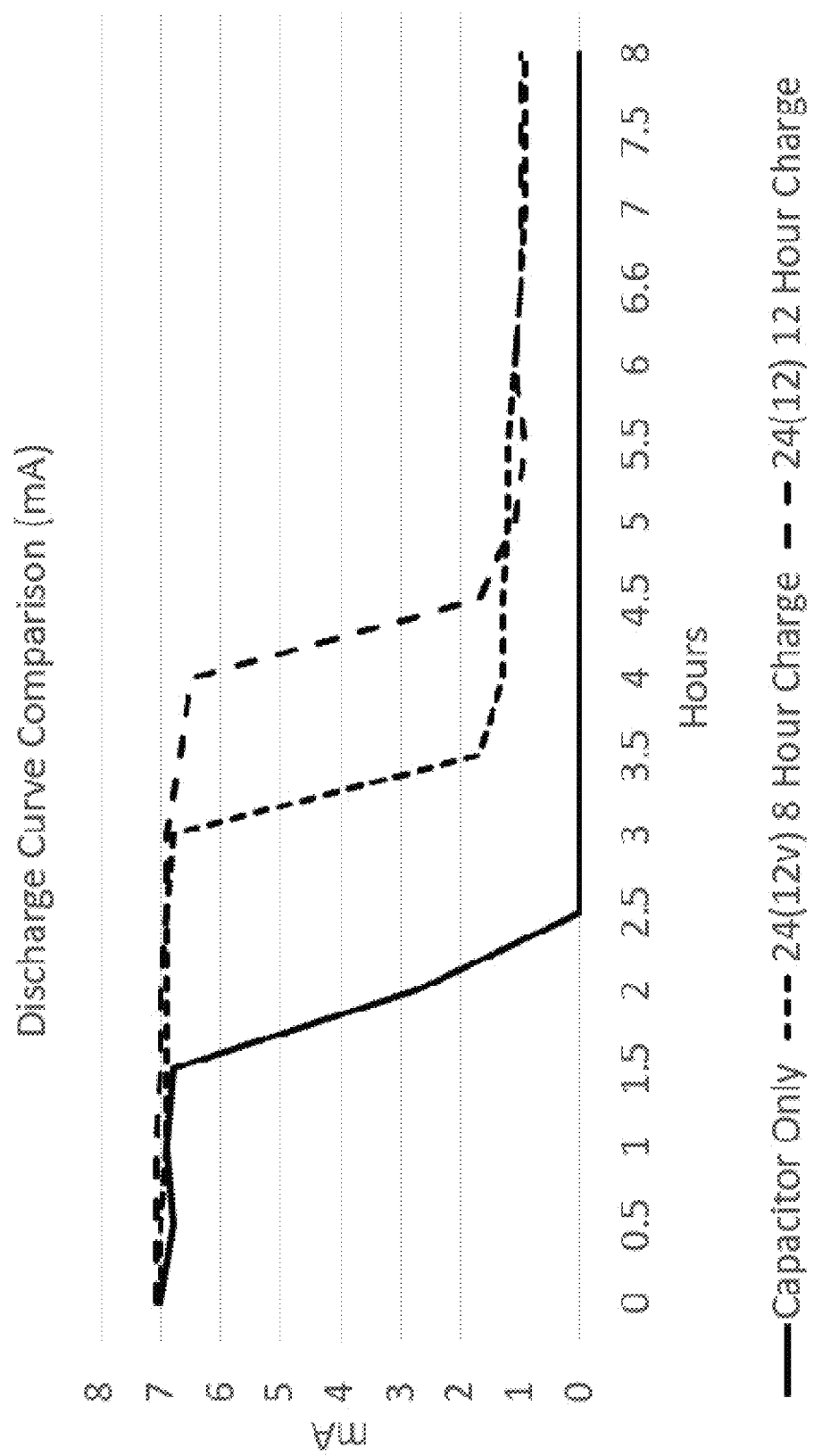
FIG. 13 illustrates a current vs. time graph of discharge curves for example electrical energy systems.

An LED with a 20 ma driver was connected to a 24.3V 1000 F capacitor. The current output was maintained around 7.0 mA for approximately 1.5 hours and then fell more rapidly to nearly zero mA over the following hour. FIG. 13 illustrates a current vs. time graph of discharge curves for a capacitor in accordance with this example.

Example 10

24 cells having a clove electrolyte and forming an electrochemical energy source were configured into two 12-cell subsets connected in parallel with cells of each subset connected in series and the electrochemical energy source was charged for 8 hours. A 24.3V 1000 F capacitor was coupled with the electrochemical energy source. An LED with a 20 ma driver was connected to the combination. The current output was maintained around 7.0 mA for approximately 3.0 hours and then fell more rapidly to nearly zero mA over the following 0.5 hours (FIG. 13).

Example 11

24 cells having a clove electrolyte and forming an electrochemical energy source were configured into two 12-cell subsets connected in parallel with cells of each subset connected in series and the electrochemical energy source was charged for 12 hours. A 24.3V 1000 F capacitor was coupled with the electrochemical energy source. An LED with a 20 ma driver was connected to the combination. The current output was maintained around 7.0 mA for approximately 4.0 hours and then fell more rapidly to nearly zero mA over the following 0.5 hours (FIG. 13).

Embodiments of the present disclosure are susceptible to being used for various purposes, including, though not limited to, enabling users to power small accessories and/or appliances in an eco-friendly manner using household materials. Embodiments offer potential emergency devices configured to provide minimal basic functions, such as LED lighting and receiving emergency information, that the average individual or houshold could afford and easily use.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. An electrical energy production kit, comprising:
   a series of cells each including:
      an anode comprising first and second electrode components formed from first and second materials, respectively;
      a cathode comprising a third electrode material; and
      a vessel containing the cathode and the anode; and
   an anhydrous electrolyte comprising potassium chloride, tartaric acid and ground cloves which, when in solution, is configured to induce oxidation at the anode and reduction at the cathode.

2. The kit as set forth in claim 1, wherein the first electrode material comprises aluminum and the second electrode material comprises zinc.

3. The kit as set forth in claim 1, wherein the third electrode material comprises copper.

4. The kit as set forth in claim 1, wherein the first electrode component further comprises an elongate shaft formed from the first electrode material and the second electrode component further comprises a tail coupled with a first end of the elongate shaft.

5. The kit as set forth in claim 4, wherein the tail curves away from the first end of the elongate shaft generally towards a second end of the elongate shaft.

6. The kit as set forth in claim 1, wherein the cathode comprises a cylinder surrounding the anode.

7. The kit as set forth in claim 1, further comprising an electrical energy store configured for coupling between a first conductor extending from the anode of a first of the series of cells and a second conductor extending from the cathode of a last of the series of cells such that free ends of the first and second conductors extend beyond the electrical energy store.

8. The kit as set forth in claim 7, wherein the electrical energy store further comprises a nickel metal hydride battery.

9. The kit as set forth in claim 7, wherein the electrical energy store further comprises a series of supercapacitors.

* * * * *